United States Patent
Wu (12)

(10) Patent No.: US 7,290,968 B1
(45) Date of Patent: Nov. 6, 2007

(54) EXTENSION FIXTURE FOR TURNING TOOL

(76) Inventor: Shih-Chang Wu, 566, Ganjhu Rd., Hemei Town, Changhua Hsien (TW)

( * ) Notice: Subject to any disclaimer, the term of this patent is extended or adjusted under 35 U.S.C. 154(b) by 0 days.

(21) Appl. No.: 11/369,138

(22) Filed: Mar. 6, 2006

(51) Int. Cl.
  *B23C 1/00* (2006.01)
(52) U.S. Cl. .......................... 409/233; 409/232; 279/8; 408/239 A
(58) Field of Classification Search .............. 409/233, 409/231, 232, 234, 136, 141, 135; 408/239 R, 408/239 A, 143, 240, 238; 82/165, 152, 82/158, 155; 249/53, 156, 4.06, 4.07, 8, 249/143
  See application file for complete search history.

(56) References Cited

U.S. PATENT DOCUMENTS

| | | | | |
|---|---|---|---|---|
| 3,720,416 A | * | 3/1973 | Blanchard | 279/156 |
| 3,813,782 A | * | 6/1974 | Nilles et al. | 409/233 |
| 3,876,214 A | * | 4/1975 | Blanchard | 279/156 |
| 3,945,752 A | * | 3/1976 | Bennett | 408/146 |
| 4,167,218 A | * | 9/1979 | Horiuchi et al. | 409/233 |
| 4,175,898 A | * | 11/1979 | Wood | 409/233 |
| 5,208,959 A | * | 5/1993 | Rosier et al. | 29/252 |
| 5,265,990 A | * | 11/1993 | Kuban | 409/232 |
| 5,397,135 A | * | 3/1995 | Smith | 279/2.04 |
| 5,403,132 A | * | 4/1995 | Truesdell | 409/233 |
| 5,431,416 A | * | 7/1995 | Thornton | 279/4.08 |
| 5,735,651 A | * | 4/1998 | Harroun | 409/233 |
| 5,846,037 A | * | 12/1998 | Boisvert | 409/233 |
| 6,036,415 A | * | 3/2000 | Sheehan et al. | 409/231 |
| 6,554,288 B2 | * | 4/2003 | Tomoni | 279/51 |
| 6,640,679 B1 | * | 11/2003 | Roberts, Jr. | 82/165 |
| 6,971,825 B2 | * | 12/2005 | Stojanovski | 409/233 |
| 7,101,127 B2 | * | 9/2006 | Kimura et al. | 409/232 |
| 2004/0261241 A1 | * | 12/2004 | Crouch | 409/233 |

* cited by examiner

*Primary Examiner*—Dana Ross
(74) *Attorney, Agent, or Firm*—Alan Kamrath; Kamrath & Associates P.A.

(57) ABSTRACT

An extension fixture for a turning tool includes a shank, a pull rod, a clamping sleeve, and a fixing member. Thus, the fixing member presses the rotation head of the pull rod to prevent the pull rod from being rotated, thereby preventing the clamping sleeve from being loosened from the pull rod, so that the turning tool is clamped by the clamping recess of the clamping sleeve. In addition, the pull rod is positioned in the shank by the fixing member to prevent the clamping sleeve from being loosened from the pull rod, so that the turning tool is clamped in the clamping sleeve closely and will not produce a vibration during operation of the turning tool, thereby preventing the turning tool from being broken due to the vibration.

9 Claims, 6 Drawing Sheets

EXTENSION FIXTURE FOR TURNING TOOL

BACKGROUND OF THE INVENTION

1. Field of the Invention

The present invention relates to an extension fixture and, more particularly, to an extension fixture for a turning tool.

2. Description of the Related Art

A conventional extension fixture for a turning tool in accordance with the prior art shown in FIGS. 6 and 7 comprises a shank 20, a pull rod 30, and a clamping sleeve 40. The shank 20 has an inside formed with a passage 21 having a first end formed with an engaging recess 22. The engaging recess 22 of the shank 20 has a distal end formed with a tapered guide face 23. The pull rod 30 is rotatably mounted in the passage 21 of the shank 20 and has a first end formed with a rotation head 31 rested on a second end of the passage 21 of the shank 20 and a second end formed with an outer thread 32 extended into the engaging recess 22 of the shank 20. The rotation head 31 of the pull rod 30 is driven by a drive tool (not shown), such as a screwdriver or the like, so as to rotate the pull rod 30. The clamping sleeve 40 is movably mounted in the engaging recess 22 of the shank 20 and has a first end formed with a screw bore 41 screwed onto the outer thread 32 of the pull rod 30 and a second end formed with a clamping recess 42 for clamping a turning tool 10 (see FIG. 6). The clamping recess 42 of the clamping sleeve 40 has a peripheral wall formed with a plurality of elongated slits 44 so that the clamping recess 42 of the clamping sleeve 40 is flexible. The second end of the clamping sleeve 40 has an outer face formed with a tapered guide face 43 rested on the tapered guide face 23 of the shank 20.

In operation, the turning tool 10 is initially received in the clamping recess 42 of the clamping sleeve 40. Then, the rotation head 31 of the pull rod 30 is driven by a drive tool to rotate the pull rod 30 which is rotated to move the clamping sleeve 40 inwardly relative to the shank 20 by engagement between the outer thread 32 of the pull rod 30 and the screw bore 41 of the clamping sleeve 40. When the clamping sleeve 40 is moved inwardly, the tapered guide face 43 of the clamping sleeve 40 is pressed by the tapered guide face 23 of the shank 20 to contract the clamping recess 42 of the clamping sleeve 40 so as to clamp the turning tool 10 in the clamping recess 42 of the clamping sleeve 40.

However, the pull rod 30 is not positioned in place, so that the pull rod 30 is easily unscrewed from the clamping sleeve 40 due to a reaction produced during operation of the turning tool 10. Thus, the clamping sleeve 40 is easily loosened from the pull rod 30 and moved outwardly relative to the shank 20, so that the turning tool 10 is not clamped in the clamping sleeve 40 closely and easily produce a vibration during operation of the turning tool 10. Thus, the turning tool 10 is easily broken due to the vibration, thereby decreasing the lifetime of the turning tool 10.

BRIEF SUMMARY OF THE INVENTION

In accordance with the present invention, there is provided an extension fixture, comprising a shank having an inside formed with a passage having a first end formed with a mounting recess and a second end formed with an engaging recess, a pull rod rotatably mounted in the passage of the shank and having a first end formed with a rotation head rotatably mounted in the mounting recess of the shank and a second end formed with an outer thread extended into the engaging recess of the shank, a clamping sleeve movably mounted in the engaging recess of the shank and having a first end formed with a screw bore screwed onto the outer thread of the pull rod and a second end formed with a clamping recess for clamping a turning tool, and a fixing member rotatably and movably mounted in the mounting recess of the shank and rested on the rotation head of the pull rod.

The primary objective of the present invention is to provide an extension fixture that will not produce vibration during operation of a turning tool.

Another objective of the present invention is to provide an extension fixture, wherein the fixing member presses the rotation head of the pull rod to prevent the pull rod from being rotated relative to the clamping sleeve, thereby preventing the clamping sleeve from being loosened from the pull rod, so that the turning tool is clamped by the clamping recess of the clamping sleeve rigidly and stably.

A further objective of the present invention is to provide an extension fixture, wherein the outer thread of the fixing member and the inner thread of the shank have a threading direction opposite to that of the outer thread of the pull rod and the screw bore of the clamping sleeve, so that the outer thread of the fixing member is further screwed into the inner thread of the shank when the outer thread of the pull rod is unscrewed from the screw bore of the clamping sleeve, thereby retaining the pull rod rigidly and stably.

A further objective of the present invention is to provide an extension fixture, wherein the pull rod is positioned in the shank by the fixing member to prevent the clamping sleeve from being loosened from the pull rod, so that the turning tool is clamped in the clamping sleeve closely and will not produce a vibration during operation of the turning tool, thereby preventing the turning tool from being broken due to the vibration, and thereby enhancing the lifetime of the turning tool.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
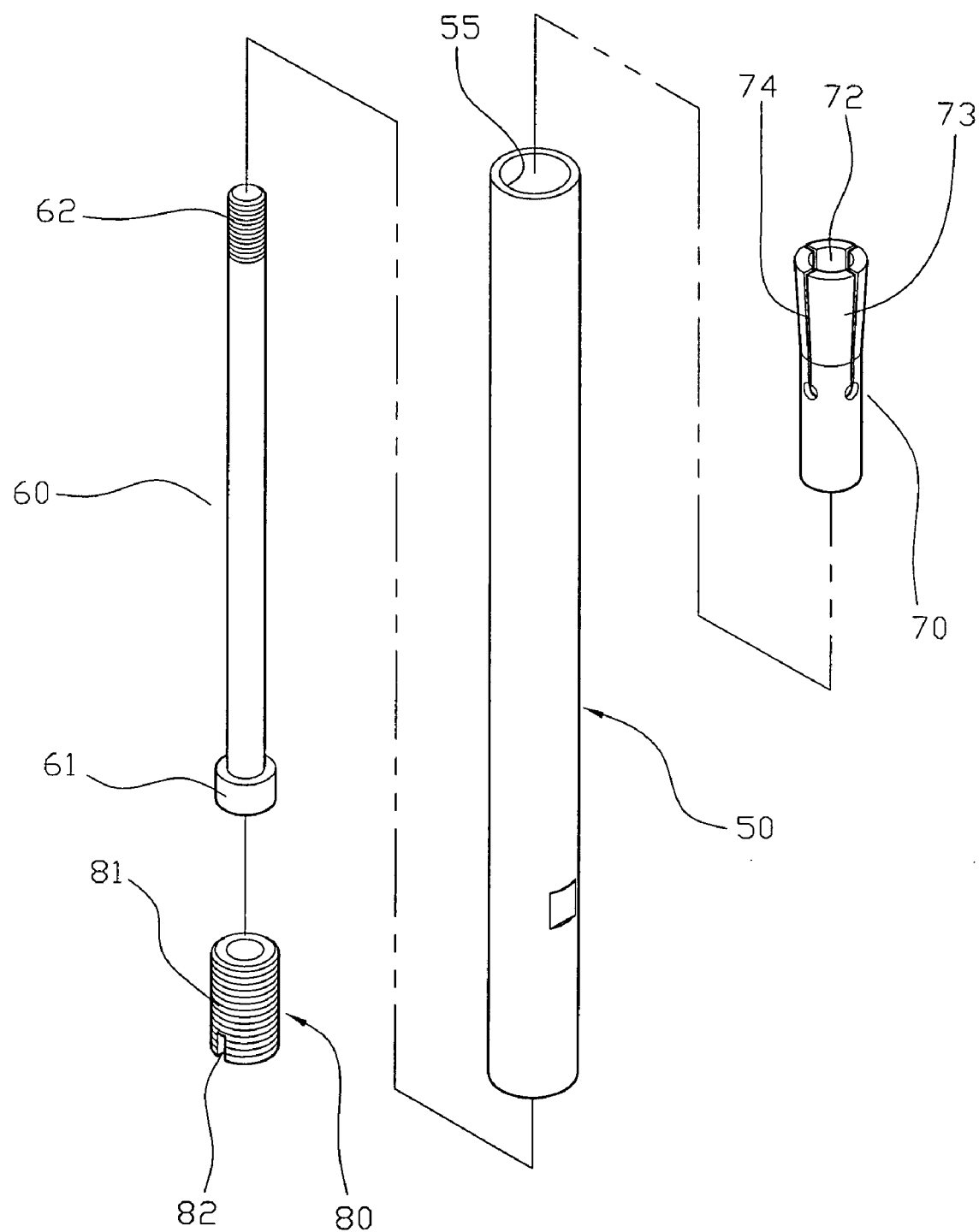
FIG. 1 is an exploded perspective view of an extension fixture in accordance with the preferred embodiment of the present invention.
Figure 2:
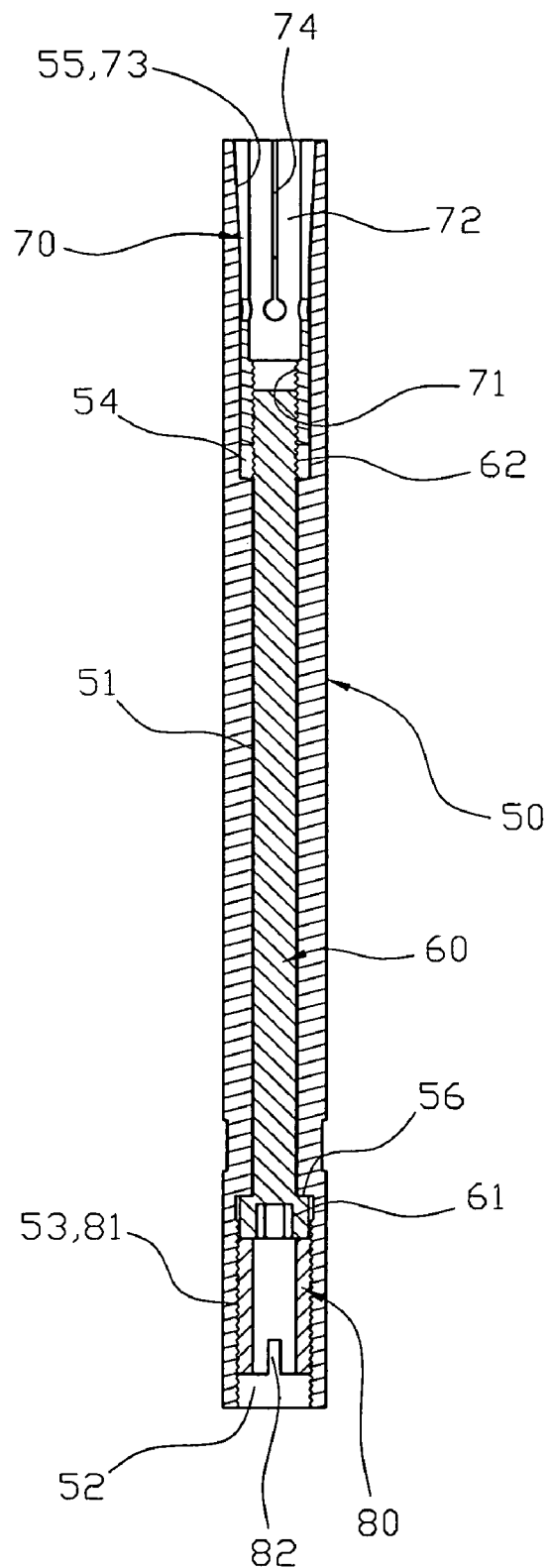
FIG. 2 is a plan cross-sectional assembly view of the extension fixture as shown in FIG. 1.
Figure 3:
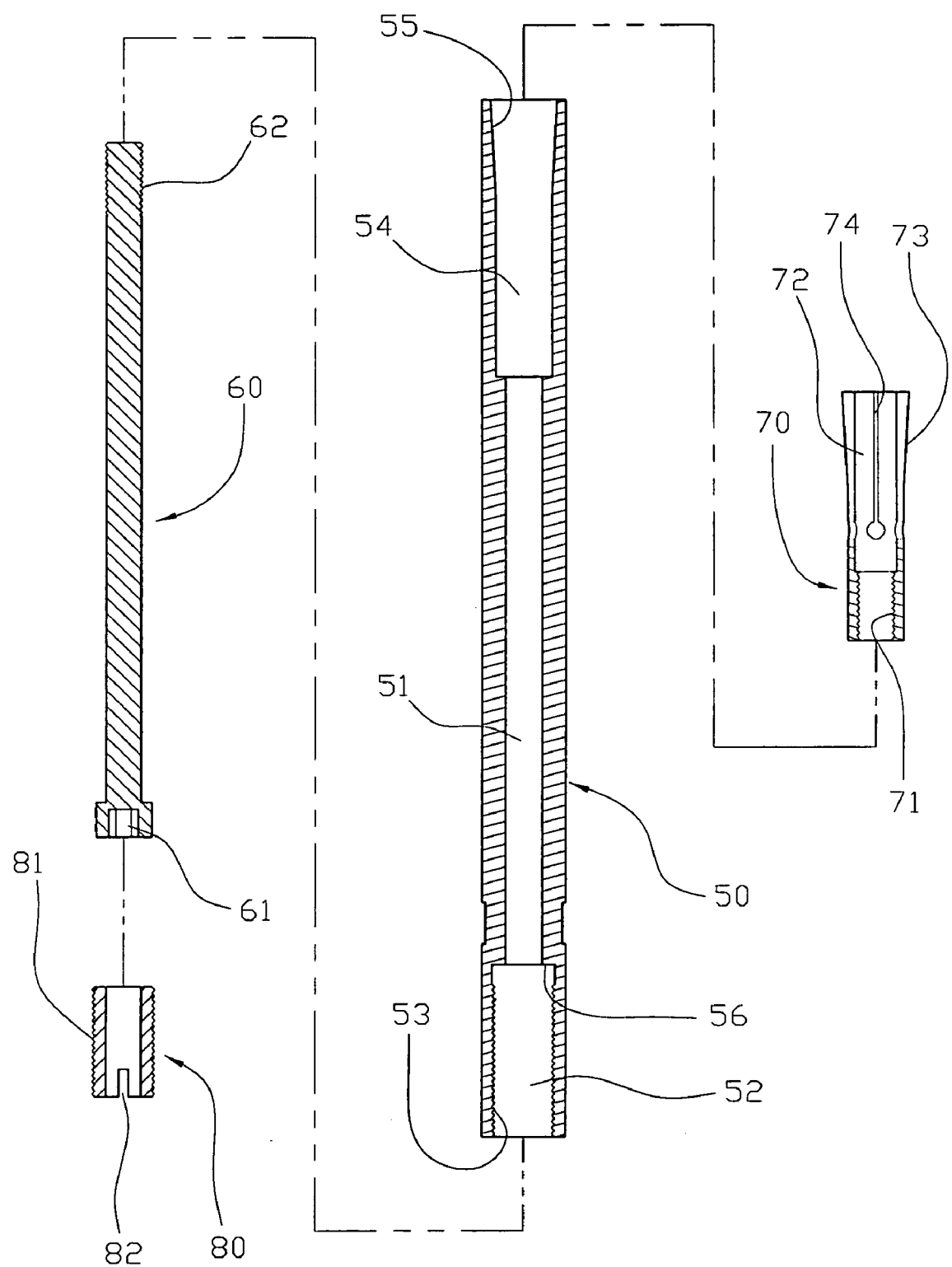
FIG. 3 is a plan cross-sectional exploded view of the extension fixture as shown in FIG. 1.

Referring to the drawings and initially to FIGS. 1-3, an extension fixture for a turning tool in accordance with the preferred embodiment of the present invention comprises a shank 50, a pull rod 60, a clamping sleeve 70, and a fixing member 80.

The shank 50 has an inside formed with a passage 51 having a first end formed with a mounting recess 52 and a second end formed with an engaging recess 54. The mounting recess 52 of the shank 50 has a wall formed with an inner thread 53. The engaging recess 54 of the shank 50 has a distal end formed with a tapered guide face 55.

The pull rod 60 is rotatably mounted in the passage 51 of the shank 50 and has a first end formed with a rotation head 61 rotatably mounted in the mounting recess 52 of the shank 50 and a second end formed with an outer thread 62 extended into the engaging recess 54 of the shank 50. The rotation head 61 of the pull rod 60 is rested on a stepped face 56 defined between the passage 51 and the mounting recess 52 of the shank 50 and is driven by a drive tool (not shown), such as a screwdriver or the like, so as to rotate the pull rod 60.

Figure 4:
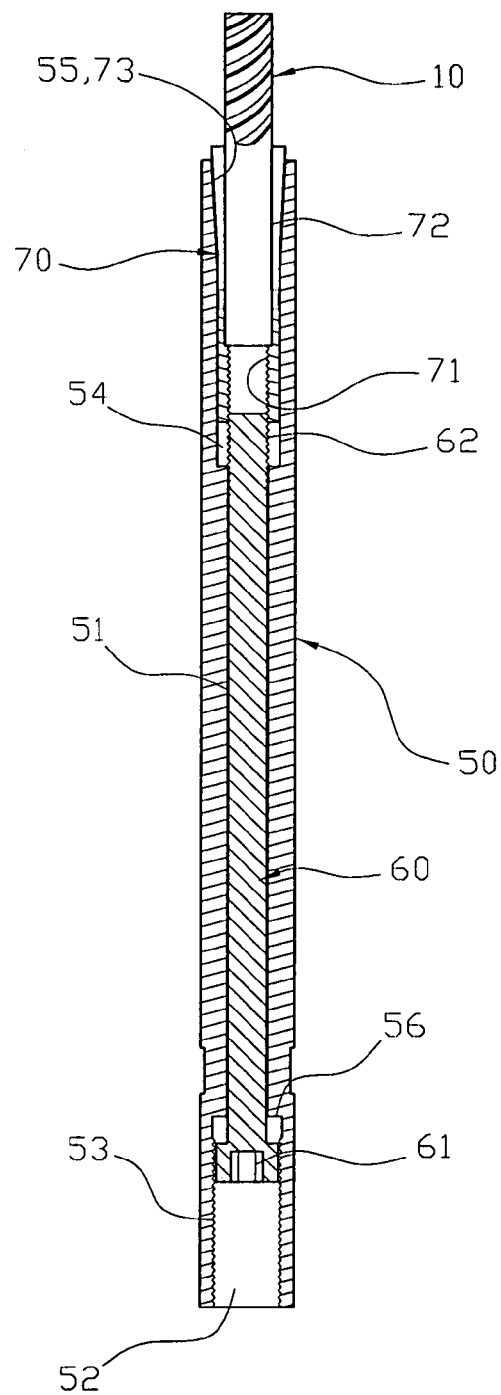
FIG. 4 is a schematic operational view of the extension fixture as shown in FIG. 2.
Figure 5:
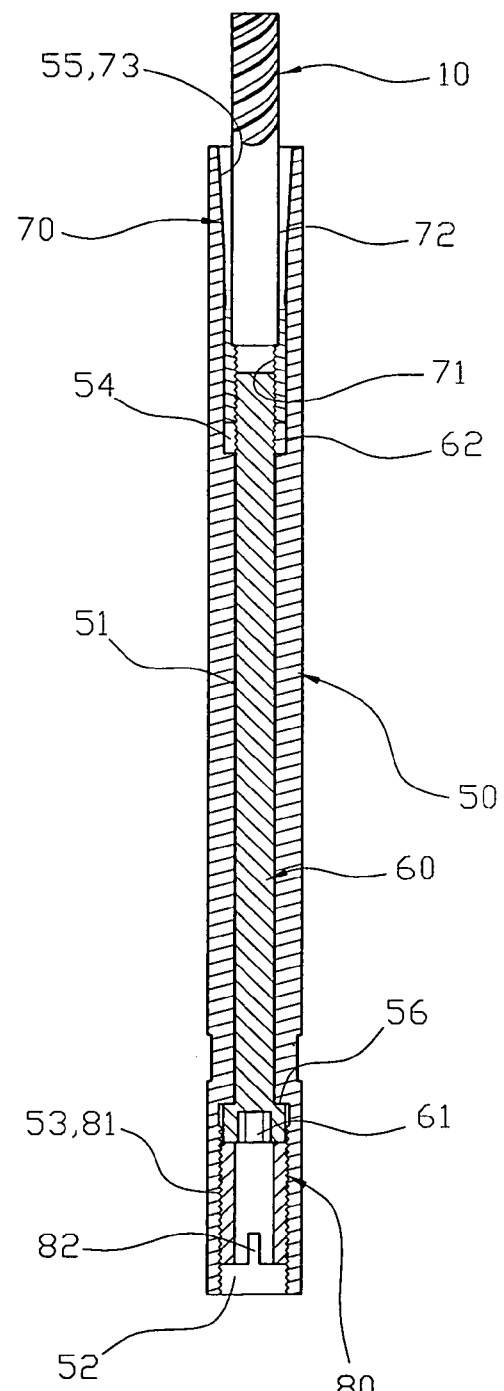
FIG. 5 is a schematic operational view of the extension fixture as shown in FIG. 4.
Figure 6:
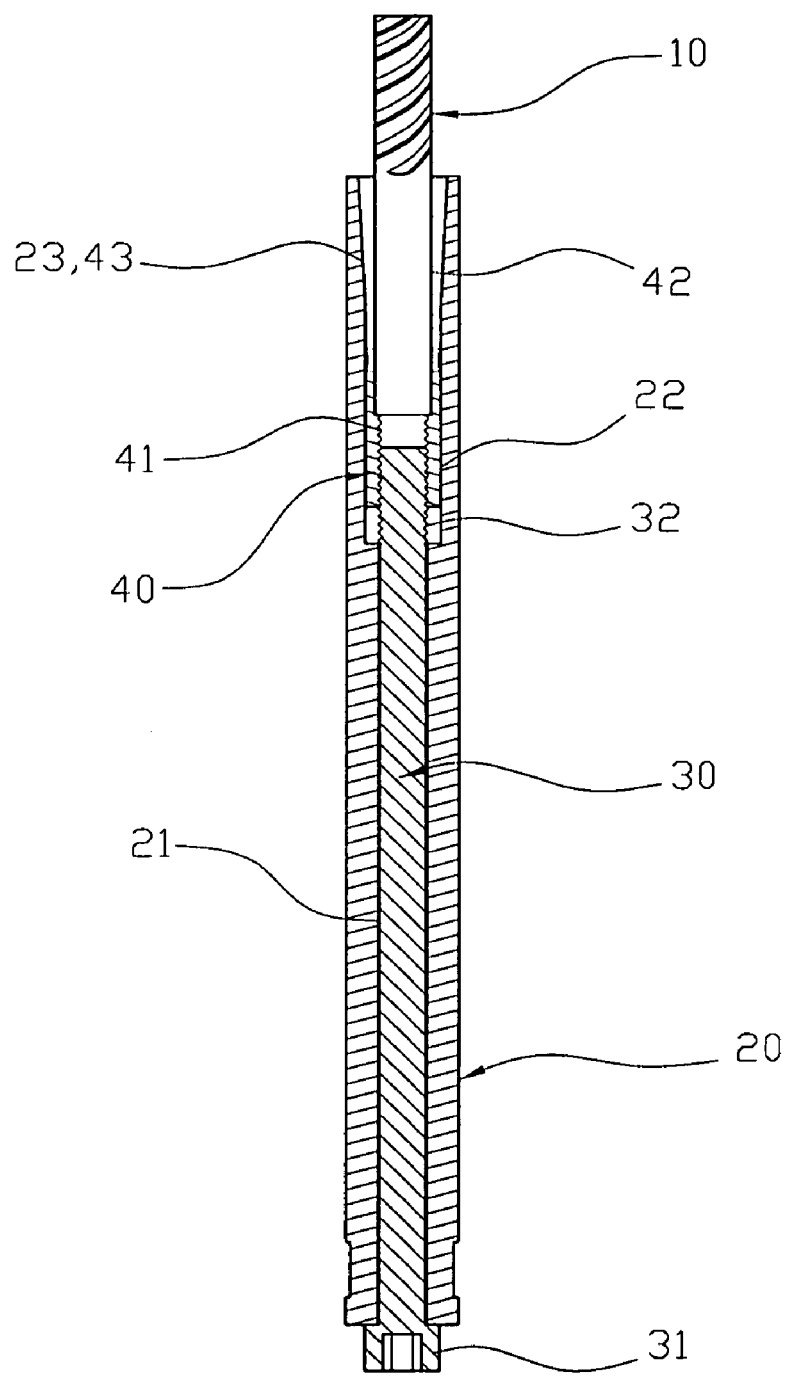
FIG. 6 is a plan cross-sectional assembly view of a conventional extension fixture in accordance with the prior art.
Figure 7:
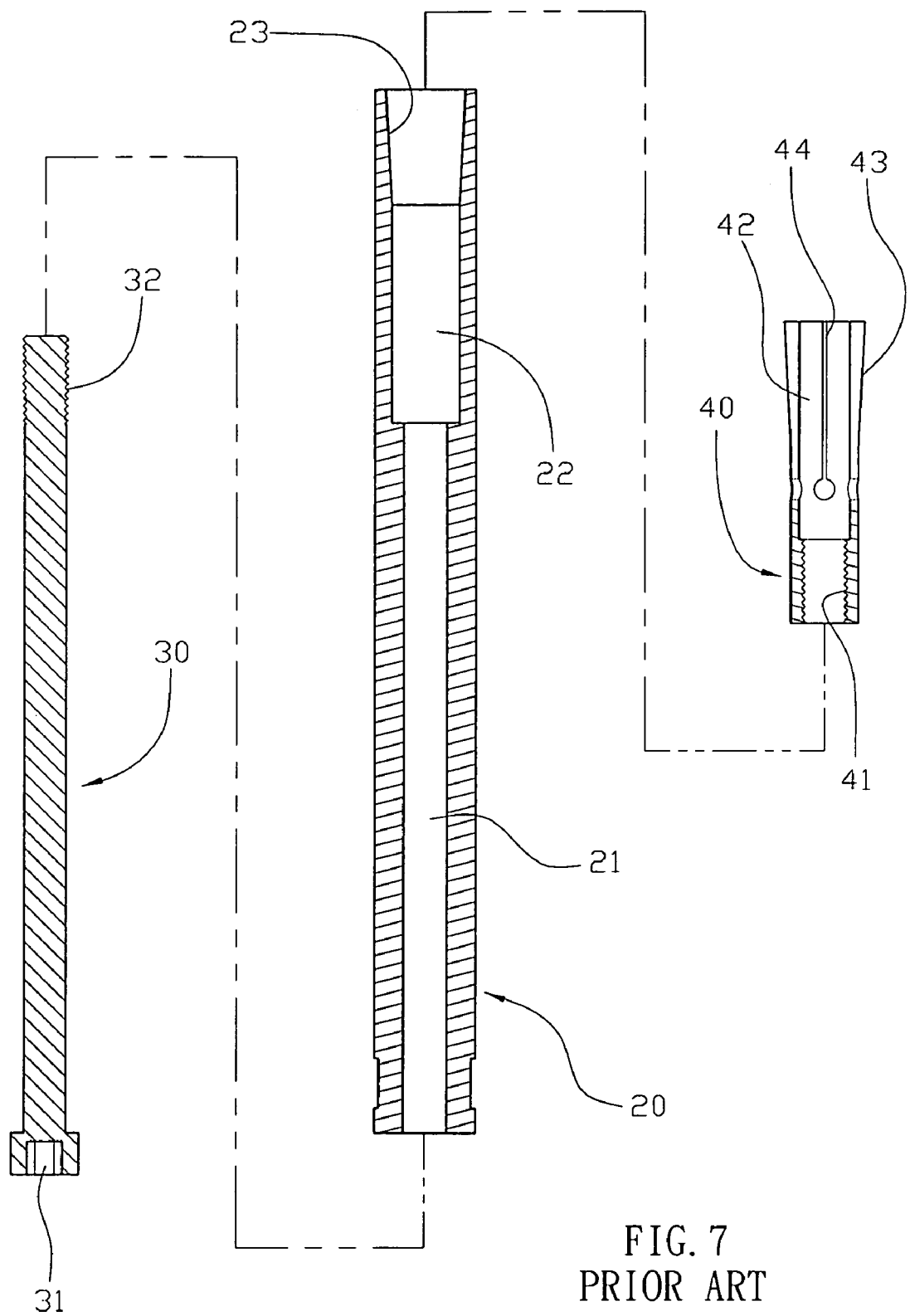
FIG. 7 is a plan cross-sectional exploded view of the conventional extension fixture as shown in FIG. 6.

The clamping sleeve 70 is movably mounted in the engaging recess 54 of the shank 50 and has a first end formed with a screw bore 71 screwed onto the outer thread 62 of the pull rod 60 and a second end formed with a clamping recess 72 for clamping a turning tool 10 (see FIGS. 4 and 5). The clamping recess 72 of the clamping sleeve 70 has a peripheral wall formed with a plurality of elongated slits 74 so that the clamping recess 72 of the clamping sleeve 70 is flexible. The second end of the clamping sleeve 70 has an outer face formed with a tapered guide face 73 rested on the tapered guide face 55 of the engaging recess 54 of the shank 50.

The fixing member 80 is rotatably and movably mounted in the mounting recess 52 of the shank 50 and rested on the rotation head 61 of the pull rod 60. The fixing member 80 has an outer wall formed with an outer thread 81 screwed into the inner thread 53 of the mounting recess 52 of the shank 50. The fixing member 80 has a first end rested on the rotation head 61 of the pull rod 60 to retain the rotation head 61 of the pull rod 60 in the mounting recess 52 of the shank 50 and a second end formed with a tool portion 82 that is driven by a drive tool (not shown), such as a screwdriver of the like, so as to rotate the fixing member 80 to move in the mounting recess 52 of the shank 50.

The outer thread 81 of the fixing member 80 and the inner thread 53 of the shank 50 have a threading direction opposite to that of the outer thread 62 of the pull rod 60 and the screw bore 71 of the clamping sleeve 70.

As shown in FIGS. 4 and 5, the fixing member 80 is initially removed from the mounting recess 52 of the shank 50, and the turning tool 10 is received in the clamping recess 72 of the clamping sleeve 70. Then, the rotation head 61 of the pull rod 60 is driven by a drive tool to rotate the pull rod 60 which is rotated to move the clamping sleeve 70 inwardly relative to the shank 50 by engagement between the outer thread 62 of the pull rod 60 and the screw bore 71 of the clamping sleeve 70. When the clamping sleeve 70 is moved inwardly, the tapered guide face 73 of the clamping sleeve 70 is pressed by the tapered guide face 55 of the shank 50 to contract the clamping recess 72 of the clamping sleeve 70 so as to clamp the turning tool 10 in the clamping recess 72 of the clamping sleeve 70.

After the turning tool 10 is clamped by the clamping recess 72 of the clamping sleeve 70, the tool portion 82 of the fixing member 80 is driven by a drive tool to rotate the fixing member 80 relative to the shank 50, and the outer thread 81 of the fixing member 80 is screwed into the inner thread 53 of the shank 50, so that the fixing member 80 is movable in the mounting recess 52 of the shank 50 to press the rotation head 61 of the pull rod 60. Thus, the fixing member 80 presses the rotation head 61 of the pull rod 60 as shown in FIG. 5 to stop movement of the pull rod 60 to prevent the pull rod 60 from being rotated relative to the clamping sleeve 70, thereby preventing the clamping sleeve 70 from being loosened from the pull rod 60 and from being moved outwardly relative to the shank 50, so that the turning tool 10 is clamped by the clamping recess 72 of the clamping sleeve 70 rigidly and stably. In addition, the outer thread 81 of the fixing member 80 and the inner thread 53 of the shank 50 have a threading direction opposite to that of the outer thread 62 of the pull rod 60 and the screw bore 71 of the clamping sleeve 70, so that the outer thread 81 of the fixing member 80 is further screwed into the inner thread 53 of the shank 50 when the outer thread 62 of the pull rod 60 is unscrewed from the screw bore 71 of the clamping sleeve 70, thereby retaining the pull rod 60 rigidly and stably.

Accordingly, the fixing member 80 presses the rotation head 61 of the pull rod 60 to prevent the pull rod 60 from being rotated relative to the clamping sleeve 70, thereby preventing the clamping sleeve 70 from being loosened from the pull rod 60, so that the turning tool 10 is clamped by the clamping recess 72 of the clamping sleeve 70 rigidly and stably. In addition, the outer thread 81 of the fixing member 80 and the inner thread 53 of the shank 50 have a threading direction opposite to that of the outer thread 62 of the pull rod 60 and the screw bore 71 of the clamping sleeve 70, so that the outer thread 81 of the fixing member 80 is further screwed into the inner thread 53 of the shank 50 when the outer thread 62 of the pull rod 60 is unscrewed from the screw bore 71 of the clamping sleeve 70, thereby retaining the pull rod 60 rigidly and stably. Further, the pull rod 60 is positioned in the shank 50 by the fixing member 80 to prevent the clamping sleeve 70 from being loosened from the pull rod 60, so that the turning tool 10 is clamped in the clamping sleeve 70 closely and will not produce a vibration during operation of the turning tool 10, thereby preventing the turning tool 10 from being broken due to the vibration, and thereby enhancing the lifetime of the turning tool 10.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. An extension fixture, comprising:
a shank having an inside formed with a passage having a first end formed with a mounting recess and a second end formed with an engaging recess;
a pull rod rotatably mounted in the passage of the shank and having a first end formed with a rotation head rotatably mounted in the mounting recess of the shank and a second end formed with an outer thread extended into the engaging recess of the shank;
a clamping sleeve movably mounted in the engaging recess of the shank and having a first end formed with a screw bore screwed onto the outer thread of the pull rod and a second end formed with a clamping recess for clamping a turning tool;
a fixing member rotatably and movably mounted in the mounting recess of the shank and rested on the rotation head of the pull rod;
wherein the mounting recess of the shank has a wall formed with an inner thread, and the fixing member has an outer wall formed with an outer thread screwed into the inner thread of the mounting recess of the shank.

2. The extension fixture in accordance with claim 1, wherein the outer thread of the fixing member and the inner thread of the shank have a threading direction opposite to that of the outer thread of the pull rod and the screw bore of the clamping sleeve.

3. The extension fixture in accordance with claim 2, wherein the outer thread of the fixing member is further screwed into the inner thread of the shank when the outer thread of the pull rod is unscrewed from the screw bore of the clamping sleeve, thereby retaining the pull rod.

4. The extension fixture in accordance with claim 1, wherein the fixing member has a first end rested on the rotation head of the pull rod to retain the rotation head of the pull rod in the mounting recess of the shank.

5. The extension fixture in accordance with claim 4, wherein the fixing member has a second end formed with a tool portion to rotate the fixing member to move in the mounting recess of the shank.

6. The extension fixture in accordance with claim 1, wherein the engaging recess of the shank has a distal end formed with a tapered guide face, and the second end of the clamping sleeve has an outer face formed with a tapered guide face rested on the tapered guide face of the engaging recess of the shank.

7. The extension fixture in accordance with claim 1, wherein the clamping recess of the clamping sleeve has a peripheral wall formed with a plurality of elongated slits so that the clamping recess of the clamping sleeve is flexible.

8. The extension fixture in accordance with claim 1, wherein the fixing member presses the rotation head of the pull rod to stop movement of the pull rod to prevent the pull rod from being rotated relative to the clamping sleeve, thereby preventing the clamping sleeve from being loosened from the pull rod, so that the turning tool is clamped by the clamping recess of the clamping sleeve.

9. An extension fixture, comprising:
a shank having an inside formed with a passage having a first end formed with a mounting recess and a second end formed with an engaging recess;
a pull rod rotatable mounted in the passage of the shank and having a first end formed with a rotation head rotatably mounted in the mounting recess of the shank and a second end formed with an outer thread extended into the engaging recess of the shank;
a clamping sleeve movably mounted in the engaging recess of the shank and having a first end formed with a screw bore screwed onto the outer thread of the pull rod and a second end formed with a clamping recess for clamping a turning tool;
a fixing member rotatable and movably mounted in the mounting recess of the shank and rested on the rotation head of the pull rod;
wherein the rotation head of the pull rod is rested on a stepped face defined between the passage and the mounting recess of the shank.

* * * * *